(12) United States Patent
Busch et al.

(10) Patent No.: US 8,400,912 B2
(45) Date of Patent: Mar. 19, 2013

(54) ACTIVATING A TUNNEL UPON RECEIVING A CONTROL PACKET

(75) Inventors: Dackary Ronald Busch, Veradale, WA (US); Kevin Q Daines, Liberty Lake, WA (US); Asheesh Jadav, Sunnyvale, CA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1433 days.

(21) Appl. No.: 11/769,514

(22) Filed: Jun. 27, 2007

(65) Prior Publication Data

US 2009/0003313 A1    Jan. 1, 2009

(51) Int. Cl.
G01R 31/08    (2006.01)

(52) U.S. Cl. ........................................ 370/228; 370/401

(58) Field of Classification Search .................. None
See application file for complete search history.

(56) References Cited

U.S. PATENT DOCUMENTS

| | | | | |
|---|---|---|---|---|
| 6,147,966 | A * | 11/2000 | Johnson et al. | 370/221 |
| 6,657,970 | B1 * | 12/2003 | Buckingham et al. | 370/249 |
| 7,046,665 | B1 * | 5/2006 | Walrand et al. | 370/392 |
| 7,230,913 | B1 * | 6/2007 | Vasseur et al. | 370/216 |
| 7,342,890 | B1 * | 3/2008 | Ferguson | 370/238 |
| 2003/0112749 | A1 * | 6/2003 | Hassink et al. | 370/225 |
| 2003/0137932 | A1 * | 7/2003 | Nishioka et al. | 370/216 |
| 2004/0022279 | A1 * | 2/2004 | Kailbach et al. | 370/542 |
| 2004/0153529 | A1 * | 8/2004 | Rikitake et al. | 709/220 |
| 2004/0205239 | A1 * | 10/2004 | Doshi et al. | 709/241 |
| 2005/0041575 | A1 * | 2/2005 | Kam et al. | 370/216 |
| 2005/0058064 | A1 * | 3/2005 | Phelps et al. | 370/225 |
| 2005/0099941 | A1 * | 5/2005 | Sestito et al. | 370/228 |
| 2005/0232144 | A1 * | 10/2005 | Doverspike et al. | 370/216 |
| 2006/0013126 | A1 * | 1/2006 | Yasuoka et al. | 370/217 |
| 2006/0146696 | A1 * | 7/2006 | Li et al. | 370/218 |
| 2006/0182035 | A1 * | 8/2006 | Vasseur | 370/238 |
| 2006/0256712 | A1 * | 11/2006 | Imajuku et al. | 370/218 |
| 2007/0041316 | A1 * | 2/2007 | Chaudhuri | 370/218 |
| 2007/0133398 | A1 * | 6/2007 | Zhai | 370/228 |
| 2007/0253416 | A1 * | 11/2007 | Raj | 370/390 |

OTHER PUBLICATIONS

"Ethernet Service OAM: Overview Applications, Deployment, and Issues", *Fujitsu Network Communications Inc.*, 18 pages (® 2006).
Technology White Paper, "End-To-End Ethernet Fault Management in Metro and Access Networks," *ALCATEL*, 12 pages (® Jun. 2005).

* cited by examiner

*Primary Examiner* — Gregory Sefcheck
*Assistant Examiner* — Joshua Smith
(74) *Attorney, Agent, or Firm* — Clements Bernard PLLC; Christopher L. Bernard; Lawrence A. Baratta, Jr.

(57) ABSTRACT

Packet switch operating methods and packet switches receive, at a packet switch, a control packet from another packet switch. The packet switch and the other packet switch are coupled together by two or more tunnels. The control packet indicates that a particular one of the tunnels is active on the other packet switch. In response, the packet switch operating methods and packet switches activate the particular tunnel indicated by the received control packet on the packet switch.

20 Claims, 8 Drawing Sheets

400

| TUNNEL | P / B | O / NO | A / I |
|---|---|---|---|
| 136 | P | O | A |
| 138 | B | O | A |
| 144 | P | O | I |
| 146 | B | O | I |

402

| TUNNEL | P / B | O / NO | A / I |
|---|---|---|---|
| 136 | P | NO | I |
| 138 | B | O | I |
| 144 | P | O | A |
| 146 | B | O | A |

404

| TUNNEL | 136 | 138 | 144 | 146 | RANK | PRIOR |
|---|---|---|---|---|---|---|
| A / I | I | I | A | A | 3 | xABCD |

ACTIVATING A TUNNEL UPON RECEIVING A CONTROL PACKET

RELATED APPLICATION DATA

This application is related to simultaneously filed U.S. patent application Ser. No. 11/769,531 entitled "Activating Tunnels Using Control Packets" and naming Dackary Ronald Busch, Kevin Q Daines, and Asheesh Jadav as inventors.

TECHNICAL FIELD

The present invention, in various embodiments, relates to methods and packet switches configured to activate a tunnel upon receiving a control packet.

BACKGROUND OF THE INVENTION

A primary tunnel in an Ethernet network may relay packets from a first packet switch through a network of intermediate packet switches to a second packet switch. Often, a backup tunnel is provisioned between the first packet switch and the second packet switch to provide a redundant path by which packets may be relayed from the first packet switch to the second packet switch. The backup tunnel may traverse a physically different path than the primary tunnel through the network of intermediate packet switches to reduce the possibility that an outage affecting the primary tunnel will also affect the backup tunnel.

In some packet switch networks, only one of the primary tunnel and backup tunnel is active at a time. If the packet switches at either end of the tunnels do not agree with respect to which of the tunnels is the active tunnel, communication problems may ensue. For example, if the first packet switch considers the primary tunnel to be active, the first packet switch may forward packets to a second packet switch via the primary tunnel. However, if the second packet switch considers the primary tunnel to be inactive, the second packet switch may drop packets received from the primary tunnel, thereby preventing communication between the packet switches.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

According to one aspect of the invention, a packet switch network includes a first packet switch, a second packet switch, and first and second tunnels coupling the first packet switch to the second packet switch. The first packet switch and the second packet switch are both configured to recognize disagreement regarding which one of the first tunnel and the second tunnel is active and which one is inactive in response to receiving control packets from each other. The packet switches are also configured to resolve the disagreement so that a particular one of the first tunnel and the second tunnel is active according to both the first packet switch and the second packet switch.

The packet switch network may further include one or more intermediate packet switches configured to relay the first tunnel and the second tunnel between the first packet switch and the second packet switch without terminating either the first tunnel or the second tunnel.

The packet switches may be configured to forward both control packets, such as connectivity fault management protocol data units (CFMPDUs) or other control packets, and non-control packets to the one tunnel that is active and to forward only control packets to the one tunnel that is inactive.

Either of the tunnels, if active, may be configured to relay only control packets and packets conforming to the 802.1ah standard. For example, an active tunnel may be configured to relay Provider Backbone Bridging (PBB) packets or Provider Backbone Transport (PBT) packets. In some configurations, both tunnels may relay packets from the first packet switch to the second packet switch and from the second packet switch to the first packet switch. In other words, the tunnels may be bi-directional.

Alternatively, the tunnels may be unidirectional. For example, in one configuration, the first tunnel and the second tunnel may both be configured to relay packets only from the first packet switch to the second packet switch. In this configuration, the packet switch network may further include a third tunnel coupling the first packet switch to the second packet switch and a fourth tunnel coupling the first packet switch to the second packet switch. The third tunnel and the fourth tunnel may be configured to relay packets in only one direction from the second packet switch to the first packet switch.

Furthermore, the first packet switch and the second packet switch may both be configured to recognize disagreement regarding which one of the third tunnel and the fourth tunnel is active and which one is inactive in response to receiving control packets from each other. The first packet switch and the second packet switch may be configured to resolve the disagreement so that a particular one of the third tunnel and the fourth tunnel is active according to both the first packet switch and the second packet switch.

Figure 1:
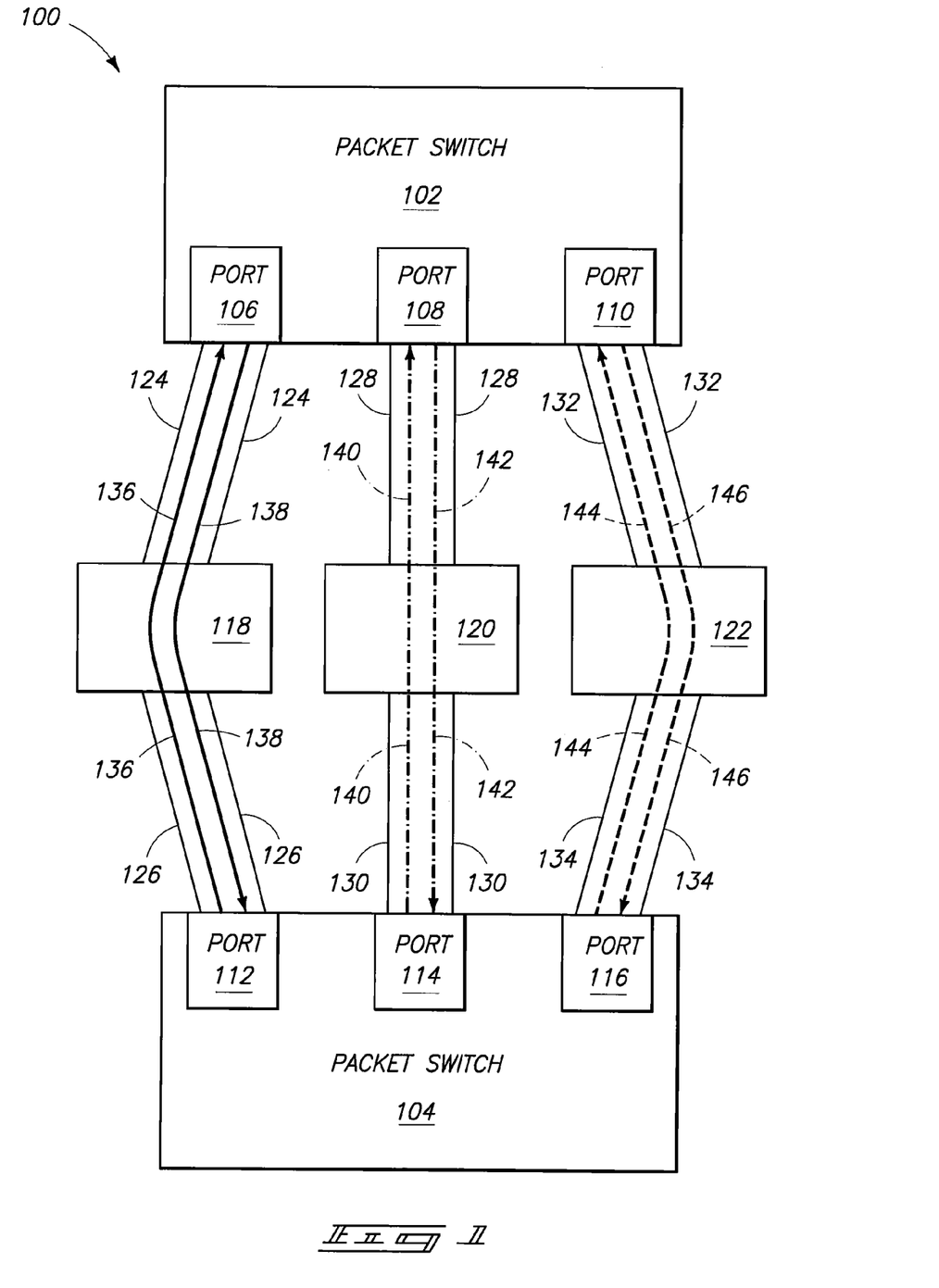
FIG. 1 illustrates a logical representation of a system comprising a packet switch network.

FIG. 1 illustrates a packet switch network 100 in accordance with the aspects of the invention described herein. Packet switch network 100 includes two packet switches 102 and 104 and three intermediate packet switches 118, 120, and 122. Packet switch 102 includes three ports 106, 108, and 110. Packet switch 104 also includes three ports 112, 114, and 116.

Port 106 of packet switch 102 is connected to intermediate packet switch 118 by a physical link 124. Another physical link 126 connects intermediate packet switch 118 to port 112 of packet switch 104. The physical links of FIG. 1 may be any combination of metallic cables (such as a copper cables), fiber optic cables, wireless communication channels, or other links enabling packets to be exchanged between the packet switches and the intermediate packet switches.

Packet switch network 100 also includes tunnels 136, 138, 140, 142, 144, and 146. These tunnels may be grouped into pairs in which one tunnel of the pair relays packets in one direction from packet switch 102 to packet switch 104 and the other tunnel of the pair relays packets in the opposite direction from packet switch 104 to packet switch 102. For example, tunnels 136 and 138 may form a first pair. This first pair of tunnels is facilitated by physical links 124 and 126 and intermediate packet switch 118.

Although intermediate packet switch 118 facilitates tunnel 136, packets relayed by tunnel 136 may be relayed only from packet switch 104 to packet switch 102. In other words, packets associated with tunnel 136 may not exit tunnel 136 at intermediate packet switch 118 and be relayed by intermediate packet switch 118 to a destination other than packet switch 102. Similarly, intermediate packet switch 118 facilitates tunnel 138 in relaying packets from packet switch 102 to packet switch 104.

Other tunnel pairs may also be formed. Tunnels 140 and 142 may form a pair that is facilitated by two physical links 128 and 130 and by intermediate packet switch 120. Tunnels 144 and 146 may form a pair that is facilitated by two physical links 132 and 134 and by intermediate packet switch 122.

The tunnels may provide redundant paths for relaying packets between packet switch 104 and packet switch 102. For example, tunnels 136, 140, and 144 may relay packets from packet switch 104 to packet switch 102. However, at a particular moment in time, only one of these three tunnels might be active and the other two tunnels may serve as inactive backup tunnels. For example, if tunnel 136 is active, tunnels 140 and 144 may be inactive tunnels that do not relay packets unless tunnel 136 becomes inactive, in which case one of tunnels 140 and 144 may become active and begin relaying packets from packet switch 104 to packet switch 102. Similarly, at a particular moment in time, one of tunnels 138, 142, and 146 may be active and the other two tunnels may be inactive.

Packet switches 102 and 104 may be aware of which tunnels are active and which are inactive and may forward packets to an active tunnel. For example, if tunnel 136 is active and tunnels 140 and 144 are inactive, packet switch 104 may forward packets destined for packet switch 102 to tunnel 136.

Packet switches 102 and 104 may treat a packet received from a tunnel differently based on whether the tunnel is active or inactive. For example, if tunnel 136 is active and tunnels 140 and 144 are inactive, packet switch 102 may accept packets received from tunnel 136 and may drop (discard) packets received from tunnels 140 and 144.

However, packets switches 102 and 104 may treat control packets differently than non-control packets. For example, packet switch 104 may forward control packets to tunnels 136, 140, and 144 even if tunnels 140 and 144 are inactive and packet switch 102 may receive control packets from tunnels 136, 140, and 144 and not drop the control packets even if tunnels 140 and 144 are inactive.

Control packets include packets that are used to facilitate communication between packet switches at the data link layer (layer-two) of the seven-layer Open Systems Interconnection communications model. Control packets may include Institute of Electrical and Electronics Engineers (IEEE) 802.1ag connectivity fault management protocol data units (CFMP-DUs) such as continuity check messages (CCMs), Link Layer Discovery Protocol (LLDP) packets, Institute of Electrical and Electronics Engineers (IEEE) 802.3ah Operations, Administration and Maintenance (OAM) packets, Link Aggregation Control Protocol (LACP) packets, Spanning Tree Protocol (STP) packets, STP Uplink Fast packets, Rapid Spanning Tree Protocol (RSTP) packets, Multiple Spanning Tree Protocol (MSTP) packets, Cisco Discovery Protocol (CDP) packets, Per VLAN Spanning Tree (PVST) packets, 802.1x packets, Unidirectional Link Detection (UDLD) packets, Port Aggregation Protocol (PAGP) packets, marker protocol packets, Generic Attribute Registration Protocol (GARP) Virtual Local Area Network (VLAN) Registration Protocol (GVRP) packets, GARP Multicast Registration Protocol GMRP packets, 802.1ak Multiple Registration Protocol (MRP) packets and the like as known to those of ordinary skill.

Packet switches 102 and 104 may be configured to send and receive one or more of the control packets listed above via the tunnels. In particular, packet switches 102 and 104 may be configured to send and receive CCMs via the tunnels. For example, packet switch 104 may forward CCMs to tunnel 144 so that packet switches 102 and 104 may monitor the operational status of tunnel 144.

Although packet switch network 100 illustrates three pairs of tunnels connecting packet switch 102 and packet switch 104, additional tunnel pairs could also be provisioned between packet switch 102 and packet switch 104. Similarly, fewer than three tunnel pairs may be used.

Figure 2:
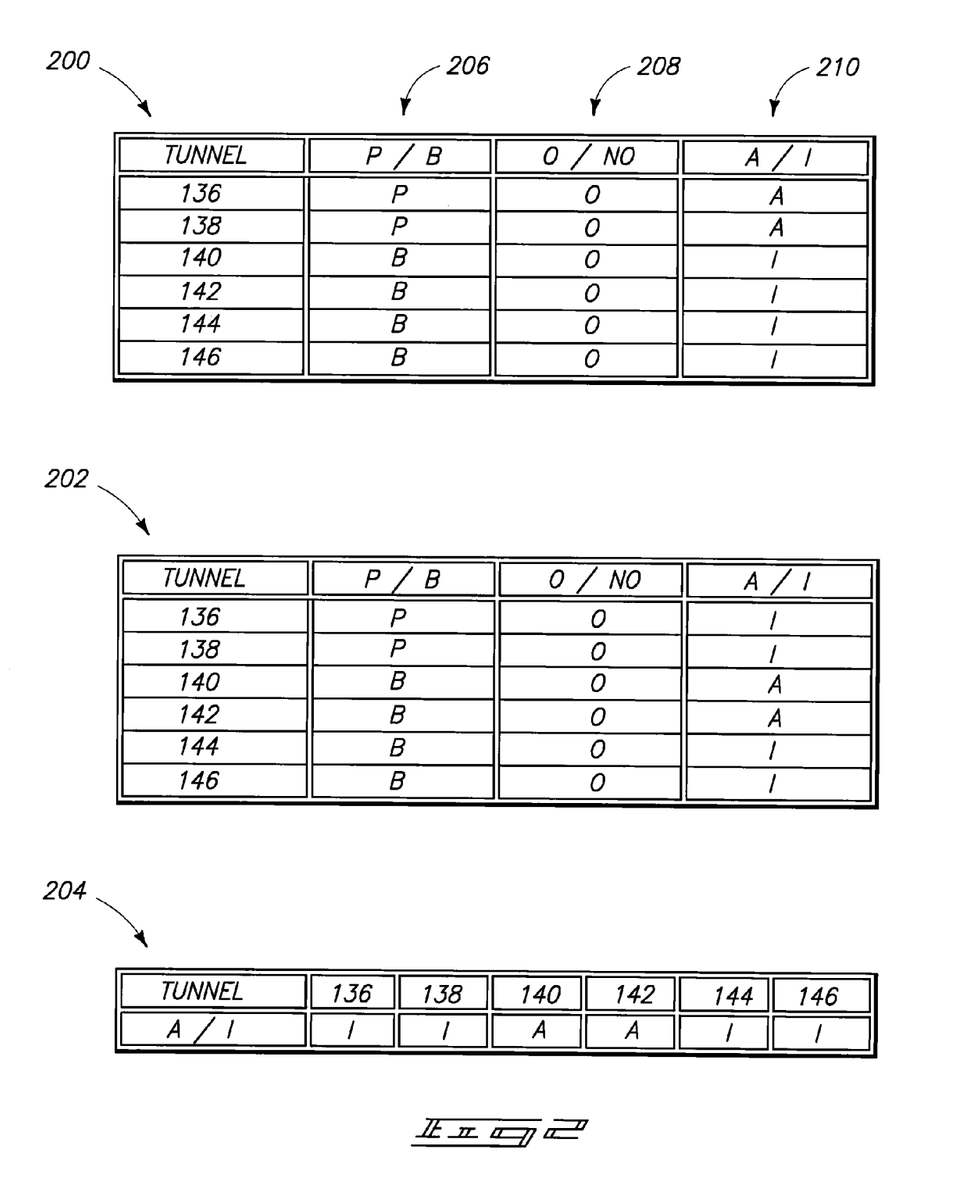
FIG. 2 illustrates charts depicting parameter states of two of the packet switches of FIG. 1 and contents of a control packet.

FIG. 2 illustrates two charts 200 and 202 depicting states of tunnels 136, 138, 140, 142, 144, and 146. Chart 200 illustrates the state of the tunnels according to packet switch 102. Column 206 of chart 200 specifies whether a tunnel is a primary tunnel (designated by a "P") or a backup tunnel (designated by a "B") according to packet switch 102. For example, column 206 specifies that tunnels 136 and 138 are primary tunnels and the other tunnels are backup tunnels.

A tunnel may be designated a primary tunnel to give the tunnel preference. For example, packet switches 102 and 104 may configure a preferred tunnel as active when possible rather than configuring a backup tunnel as active. This preference may be advantageous in some packet switch networks.

For example, tunnel 136 may be provisioned to have a greater bandwidth than tunnels 140 and 144. Accordingly, it may be advantageous to send packets through tunnel 136 rather than through tunnels 140 or 144. In this example, tunnel 136 may be designated as primary and tunnels 140 and 144 as backup so that tunnel 136 will be configured as active whenever possible instead of tunnels 140 and 144.

Column 208 of chart 200 depicts the operational status of tunnels 136, 138, 140, 142, 144, and 146 according to packet switch 102. The status may be operational (designated by an "O") or non-operational (designated by an "NO"). A tunnel is operational when it is presently able to relay to packets and is non-operational when not presently able to relay packets. For example, tunnel 136 may become non-operational if physical link 124 is severed. In this example, tunnel 136 will continue to be a primary tunnel, but will be designated as non-operational. The operational state of a tunnel may change over time and without user intervention.

Column 210 of chart 200 depicts whether a tunnel is active or inactive according to packet switch 102. For example, tunnel 136 is depicted as being an active tunnel. An active tunnel may relay both control packets and non-control packets from one packet switch to the other. Packet switch 102 may initially configure whether a particular tunnel is active or inactive based on whether the tunnel is primary or backup. However, packet switch 102 may change whether a particular tunnel is active or inactive over time regardless of whether the particular tunnel is primary or backup. For example, if packet switch 102 determines that tunnel 136 is no longer operational, packet switch 102 may change the configuration of tunnel 136 to be inactive rather than active.

An inactive tunnel might not relay packets other than control packets. An inactive tunnel may be operational, meaning that it is capable of relaying packets, even though it is inactive.

Chart 200 illustrates that tunnels 136 and 138 are active, operational, primary tunnels, whereas the other tunnels are inactive, operational, backup tunnels.

Chart 202 includes information structured in a way similar to chart 200 and illustrates the status of the tunnels according to packet switch 104. According to chart 202, packet switch 104 considers tunnels 140 and 142 to be active and tunnels 136, 138, 144, and 146 to be inactive. In contrast, packet switch 102 considers tunnels 136 and 138 to be active and tunnels 140, 142, 144, and 146 to be inactive. Accordingly, packet switches 102 and 104 are in disagreement.

This disagreement may be troublesome. For example, if packet switch 104 sends a packet to packet switch 102 via tunnel 140 (which is active according to packet switch 104), packet switch 102 may drop the packet upon receiving the packet from tunnel 140 since according to packet switch 102 tunnel 140 is inactive. Furthermore, packet switch 102 may transmit a packet on tunnel 138 (which is active according to packet switch 102) but packet switch 104 may drop the packet upon receiving it via tunnel 138 because, according to packet switch 104, tunnel 138 is inactive. Accordingly, communication between packet switch 102 and packet switch 104 may be precluded due to the disagreement.

Chart 204 illustrates contents of a control packet that packet switch 104 may send to packet switch 102. The contents describe the configuration of the tunnels according to packet switch 104. For example, chart 204 illustrates that, according to packet switch 104, tunnels 136, 138, 144, and 146 are inactive and tunnels 140 and 142 are active.

Chart 204 explicitly describes tunnels 136, 138, 144, and 146 as being inactive. However, the control packet may alternatively explicitly convey only that tunnels 140 and 142 are active if packet switch 102 is configured to recognize that if a particular tunnel is active, other associated tunnels relaying packets in the same direction as the particular tunnel are inactive.

For example, if the control packet explicitly conveys only the fact that tunnel 140 is active, packet switch 102 may conclude that tunnels 136 and 144 are inactive.

The control packet may be a CFMPDU conforming to the IEEE 802.1ag standard, such as a CCM. Type-length value (TLV) fields of the CFMPDU may designate which tunnels are active and which tunnels are inactive. The TLV fields may be sent in all CCMs if desired.

Upon receiving the control packet, packet switch 102 may compare the contents of the packet with the tunnel configuration illustrated by chart 200 and recognize that that packet switch 104 and packet switch 102 disagree as to configuration of the tunnels. Packet switch 102 and packet switch 104 may resolve the disagreement by altering the tunnel configuration at either packet switch 102 or packet switch 104. Packet switch 102 and packet switch 104 may use one or more of various techniques, described below, to resolve the disagreement.

According to another aspect of the invention, a packet switch operating method includes receiving, at the packet switch, a control packet from another packet switch, the packet switch and the other packet switch being coupled together by two or more tunnels. The control packet indicates that a particular one of the tunnels is active on the other packet switch and may indicate that all of the tunnels other than the particular tunnel are inactive on the other packet switch. In response to receiving the control packet, the particular tunnel indicated by the received control packet is activated on the packet switch. In some cases, the particular tunnel may be activated prior to the expiration of a CCM loss interval.

Figure 3:
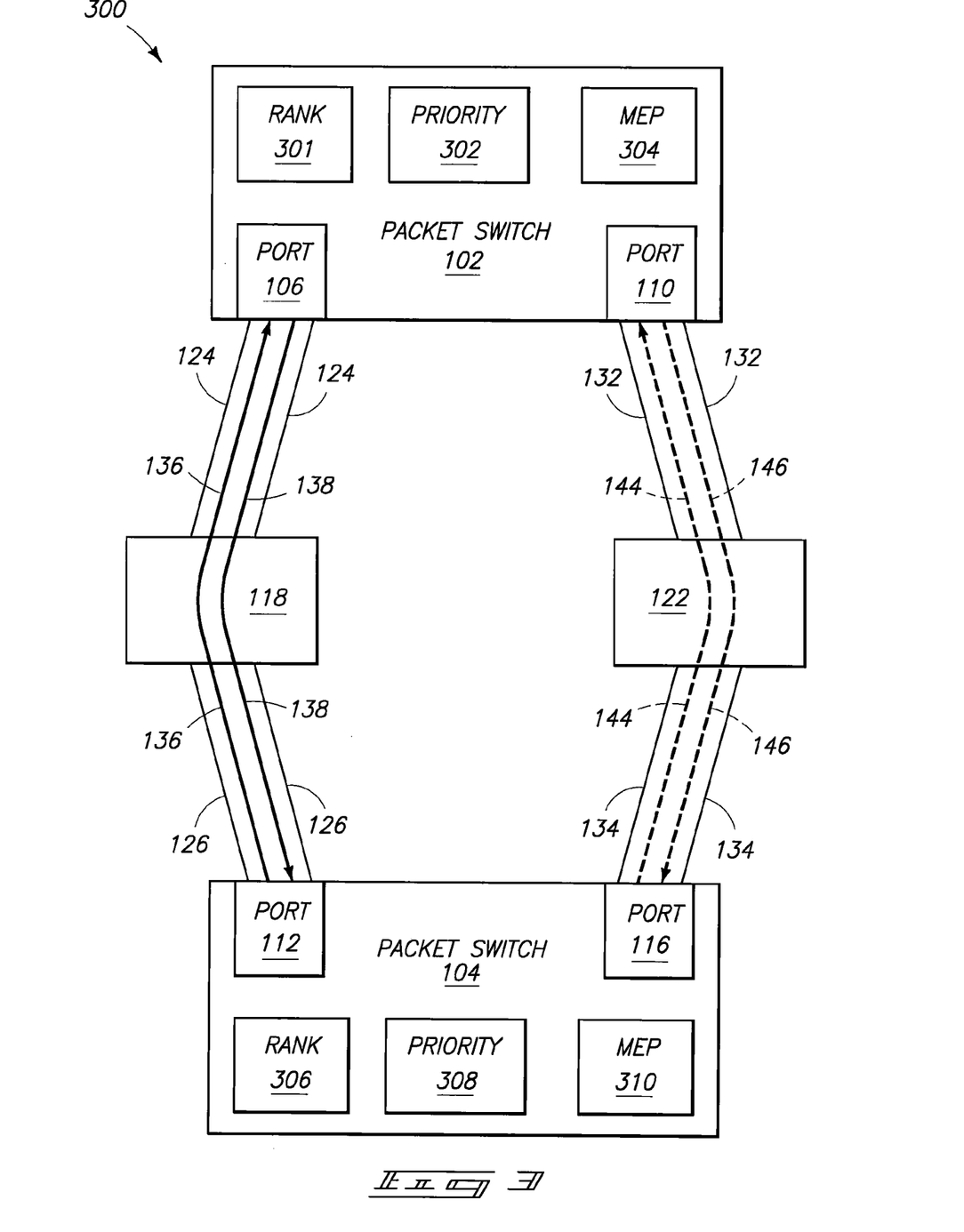
FIG. 3 illustrates a logical representation of another system comprising a packet switch network.

The CCM loss interval may be the number of CCMs that a MEP may fail to receive via a particular tunnel before the MEP concludes that the particular tunnel is non-operational. For example, if the CCM loss interval is five, and MEP 304 sends CCM messages to MEP 310 via tunnel 138 every 100 milliseconds, MEP 310 may conclude that tunnel 138 is non-operational after a period of at least 500 milliseconds has passed without receiving a CCM message from MEP 304 on tunnel 138. Alternatively, the CCM loss interval may be a period of time rather than a number of CCMs.

The control packet may be an Ethernet CFMPDU compliant with the IEEE 802.1ag standard. One or more TLV fields of the control packet may provide the indication that the particular one of the tunnels is active on the other packet switch.

Activating the particular tunnel may include configuring the packet switch to forward control packets and non-control packets to the other packet switch via the particular tunnel. Alternatively or additionally, activating the particular tunnel may include configuring the packet switch to accept control packets and non-control packets received from the other packet switch via the particular tunnel.

The method may also include deactivating one of the tunnels that was active when the control packet was received in response to receiving the control packet. Deactivating may include configuring the packet switch to forward only control packets to the deactivated tunnel. Alternatively or additionally, deactivating may include configuring the packet switch to discard non-control packets received from the deactivated tunnel.

The tunnels may be unidirectional in some configurations. In one configuration, the tunnels may include a first set of tunnels and a second set of different tunnels. The first set of tunnels may relay packets only from the packet switch to the other packet switch and the second set of tunnels may relay packets only from the other packet switch to the packet switch. Only one tunnel of the first set and only one tunnel of the second set might be active at a time, the other tunnels of the first set and the second set being inactive. In this configuration, the control packet may be received from one of the tunnels of the second set.

In another configuration, the tunnels may include a first set of tunnels and a second set of different tunnels. The first set of tunnels may relay packets only from the other packet switch to the packet switch and the second set of tunnels may relay packets only from the packet switch to the other packet switch. Receiving the control packet may include receiving the control packet from one of the tunnels of the first set of tunnels.

The method may also include, after receiving the control packet, determining that the particular tunnel is inactive in the packet switch and determining the other packet switch has a higher rank than the packet switch with respect to the tunnels based on a rank field of the received control packet and a rank of the packet switch. In some cases, the rank field and the rank of the packet switch both include at least one item selected from among a user-configurable value, a medium access control (MAC) address, and a serial number.

Alternatively, the method may include, after receiving the control packet, determining the particular tunnel is inactive in the packet switch and determining the other packet switch has a same rank as the packet switch with respect to the tunnels based on a rank field of the received control packet and a rank of the packet switch. The alternative method may further include determining that the other packet switch has a higher priority than the packet switch with respect to the tunnels based on a priority field of the received control packet and a priority of the packet switch. The priority field and the priority of the packet switch may both include at least one item selected from among a user-configurable value, a MAC address, and a serial number.

FIG. 3 illustrates a packet switch network 300 in accordance with one or more of the aspects of the invention described herein. Packet switch network 300 is similar to packet switch network 100 except that packet switch network 300 includes only two tunnel pairs connecting packet switch 102 with packet switch 104. These tunnel pairs include tunnels 136, 138, 144, and 146.

FIG. 3 illustrates additional details of packet switches 102 and 104 not illustrated in FIG. 1. For example, packet switch 102 includes a rank 301, a priority 302, and a maintenance endpoint (MEP) 304. Similarly, packet switch 104 also includes a rank 306, a priority 308, and an MEP 310.

Rank 301 and rank 306 may be user-configurable values used to assign a rank. For example, if a user desires that packet switch 102 have a higher rank than packet switch 104, the user may configure rank 301 to have a value that is higher than the value of rank 306.

Ranks 301 and 306 may be numeric values, alphanumeric values, medium access control (MAC) addresses, serial numbers, or other identifiers capable of establishing a rank.

Priorities 302 and 308 may also be user-configurable values. Typically, however, priority 302 is different from priority 308. Priorities 302 and 308 may be identifiers that have been previously assigned to packet switches 102 and 104. For example, priority 302 may be the serial number of packet switch 102. Similarly, priority 308 may be the serial number of packet switch 104.

As will be described below, priority 302 and priority 308 may be used to determine which of packet switches 102 and 104 has priority with respect to configuring a tunnel as either active or inactive. By using a unique value such as a serial number or a MAC address, one may insure that packet switch 102 and packet switch 104 will not have the same priority value. Accordingly, one of the packet switches will have a higher priority than the other packet switch.

Maintenance endpoint 304 may be used to monitor the operational status of tunnels 136, 138, 144, and 146. MEP 304 may periodically send CCM messages to MEP 310 via tunnel 138 and/or tunnel 146. For example, MEP 304 may periodically send CCM messages via tunnel 146 and MEP 310 may monitor CCM messages received on tunnel 146. If MEP 310 does not receive one or more of the CCM messages sent by MEP 304, MEP 310 may conclude that tunnel 146 is non-operational.

In some configurations, packet switches 102 and 104 may use a user-defined CCM loss interval. In response to the expiration of the CCM loss interval, MEP 310 may send a CCM to MEP 304 via tunnel 136 containing a remote defect indication (RDI). The RDI informs MEP 304 that MEP 310 has detected a problem with tunnel 138. In this manner, both MEP 304 and MEP 310 may monitor the operational status of tunnel 138.

MEP 304 and MEP 310 may be used to transition a tunnel from being active to being inactive. For example, tunnels 136 and 138 may be active, primary tunnels, and tunnels 146 and 144 may be inactive, backup tunnels. MEP 304 and MEP 310 may be configured to send and receive CCM messages via tunnels 136 and 138 in order to monitor the operational status of tunnels 136 and 138.

If MEP 304 or MEP 310 detects that tunnel 138 is no longer operational, packet switches 102 and 104 may change the status of tunnel 138 to be inactive rather than active, and may change the status of tunnel 146 from inactive to active. Consequently, packet switch 102 may relay packets to packet switch 104 via tunnel 146 instead of tunnel 138. Similarly, if MEP 304 or MEP 310 detects that tunnel 136 is no longer operational, it may change the configuration of tunnel 136 to be inactive rather than active, and may change the status of tunnel 144 to be active rather than inactive. Consequently, packet switch 104 may send packets to packet switch 102 via tunnel 144 instead of tunnel 136.

In some configurations, packet switch 102 and packet switch 104 may activate or inactivate pairs of tunnels together. For example, if MEP 304 or MEP 310 detects that tunnel 138 is no longer operational, packet switch 102 and packet switch 104 may inactivate tunnels 138 and 136, and activate tunnels 144 and 146.

MEP 304 and MEP 310 may continue to attempt to send CCMs via tunnels 136 and 138 even though these tunnels are non-operational. If tunnel 136 or tunnel 138 becomes operational again, MEP 304 and MEP 310 may detect the presence of CCM messages and determine that tunnel 136 or tunnel 138 is now operational.

Since tunnels 136 and 138 are primary tunnels and tunnels 144 and 146 are backup tunnels, packet switch 102 and packet switch 104 may be configured to inactivate tunnels 144 and/or 146, and re-activate tunnels 136 and/or 138 if packet switch 102 or packet switch 104 detects that tunnels 136 and 138 subsequently become operational.

In some cases, one packet switch, for example packet switch 102, may be configured to revert to a primary tunnel that becomes operational from a backup tunnel as was described above. However, packet switch 104 might not be similarly configured. Consequently in a situation where tunnel 136, which is the primary tunnel, has become non-operational and inactive and tunnel 144 has become active, and later tunnel 136 becomes operational, packet switch 102 may detect that tunnel 136 is now operational and de-activate tunnel 144 and activate tunnel 136. However, packet switch 104 might not activate tunnel 144 even though tunnel 136 has become operational.

In this situation, packet switch 102 and packet switch 104 are no longer synchronized with respect to the state of the tunnels since packet switch 102 has configured tunnel 136 to be an active tunnel and tunnel 144 to be an inactive tunnel, while packet switch 104 has configured tunnel 136 to be an inactive tunnel and tunnel 144 to be an active tunnel.

As was described above in relation to FIG. 2, packet switches 102 and 104 may send control packets to each other. The control packets may indicate the current tunnel configuration of the packet switch sending the control packet.

Figure 4:
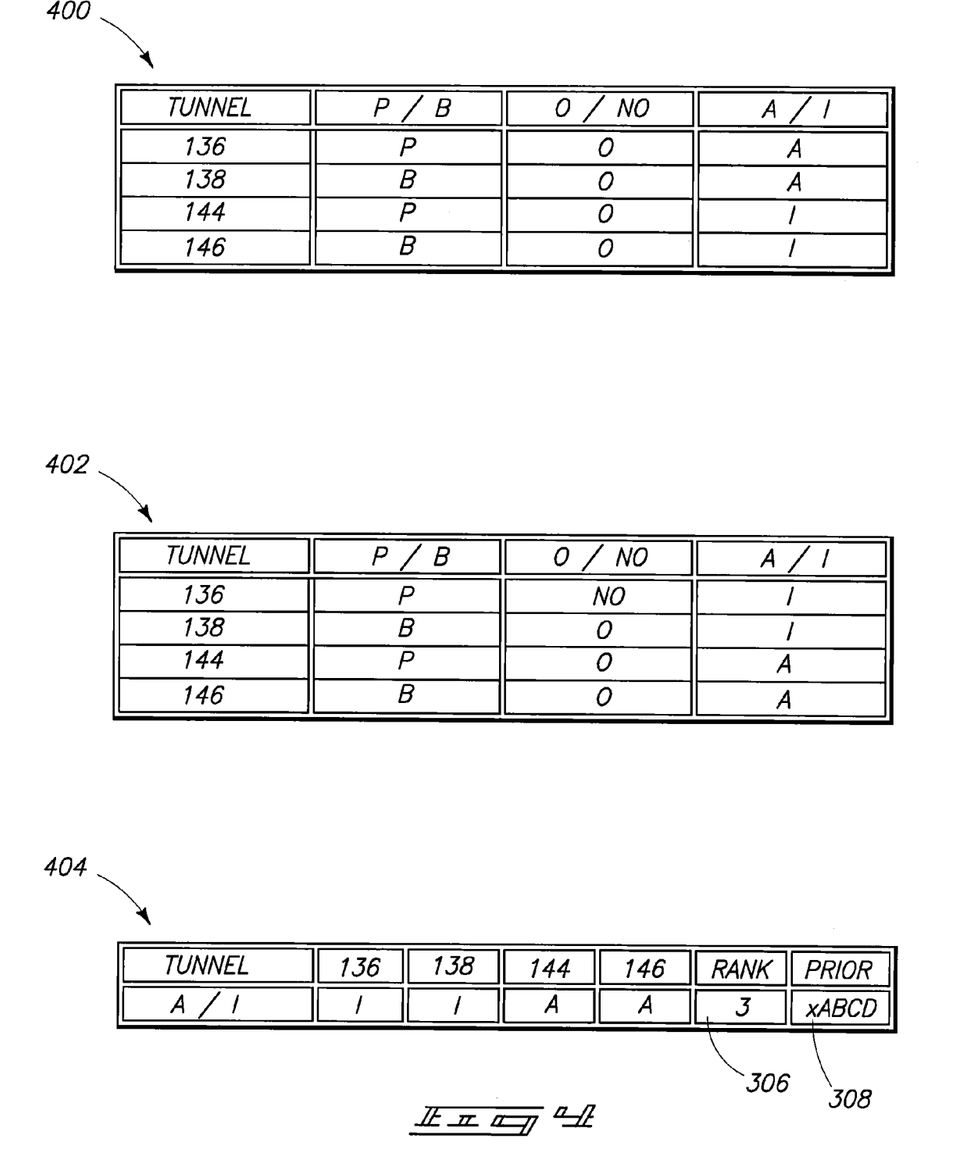
FIG. 4 illustrates charts depicting parameter states of two of the packet switches of FIG. 3 and contents of a control packet.

FIG. 4 illustrates three charts that convey information related to packet switch network 300. Chart 400 illustrates the state of tunnels 136, 138, 144, and 146 of packet switch network 300 at a particular point in time according to packet switch 102. Note that packet switch 102 has configured tunnels 136 and 138 as active, and tunnels 144 and 146 as inactive.

Chart 402 illustrates the state of tunnels 136, 138, 144, and 146 of packet switch network 300 at a particular point in time according to packet switch 104. Note that packet switch 104 has a different tunnel configuration than packet switch 102 since, according to packet switch 104, tunnels 144 and 146 are active, and tunnels 136 and 138 are inactive.

Chart 404 illustrates the contents of a control packet sent from packet switch 104 to packet switch 102. The contents indicate that packet switch 104 has configured tunnels 144 and 146 as active and tunnels 136 and 138 as inactive. In addition, the control packet may contain rank 306 and priority 308. Upon receiving the control packet, packet switch 102 may use methods described below to determining whether to conform its tunnel configuration to the tunnel configuration of packet switch 104 as indicated in the control packet.

As was described above, packet switch 102 or packet switch 104 may send a control packet containing its tunnel configuration when packet switch 102 or packet switch 104 detects that a tunnel has become non-operational and has consequently deactivated the non-operational tunnel and activated a different, operational tunnel. In response to detecting the non-operational tunnel, a packet switch may send several control packets containing the packet switch's tunnel configuration to ensure that a packet switch to which the control packets are sent receives at least one of the control packets. For example, the packet switch may send one control packet, wait for a designated amount of time, send an identical control packet, wait for the designated amount of time, and then send another identical control packet.

Packet switch 102 and packet switch 104 may use other techniques to send control packets containing tunnel configurations. For example, packet switches 102 and 104 may be configured to send control packets having tunnel configurations periodically within TLV fields of CCM messages.

As was mentioned above, tunnel configurations of packet switches 102 and 104 may become unsynchronized if packet switch 102 is configured to revert to a primary tunnel but packet switch 104 is not configured to revert to a primary tunnel.

Alternatively, packet switches 102 and 104 may become unsynchronized in other scenarios. In one scenario, packet switch 102 may configure tunnel 136 as primary and tunnel 144 as backup, but packet switch 104 may configure tunnel 144 as primary and tunnel 136 as backup. This mismatch may be intentional or unintentional. When packet switches 102 and 104 are powered up, packet switch 102 may configure tunnel 136 as active (since tunnel 136 is primary) and tunnel 144 as inactive (since tunnel 144 is backup). In contrast, packet switch 104 may configure tunnel 144 as active (since tunnel 144 is primary) and tunnel 136 as inactive (since tunnel 136 is backup). Consequently, upon power-up packet switch 102 and packet switch 104 will not be synchronized.

In another scenario, power to packet switch 102 may be lost and subsequently restored. During the process of powering up, packet switch 102 may designate backup tunnel 144 to be active rather than primary tunnel 136. This may happen if packet switch 102 detects that tunnel 144 is operational prior to detecting that tunnel 136 is operational and packet switch 102 is configured to activate the tunnel that becomes operational first.

Other scenarios may exist in which packet switch 102 and packet switch 104 may become unsynchronized. Method 600, described below in relation to FIG. 6, may be utilized to synchronize packet switch 102 and 104. Once packet switches 102 and 104 are synchronized, the packet switches may adapt their tunnel configurations upon receiving a control packet describing a tunnel configuration different from the tunnel configuration of the packet switch receiving the control packet.

Figure 5:
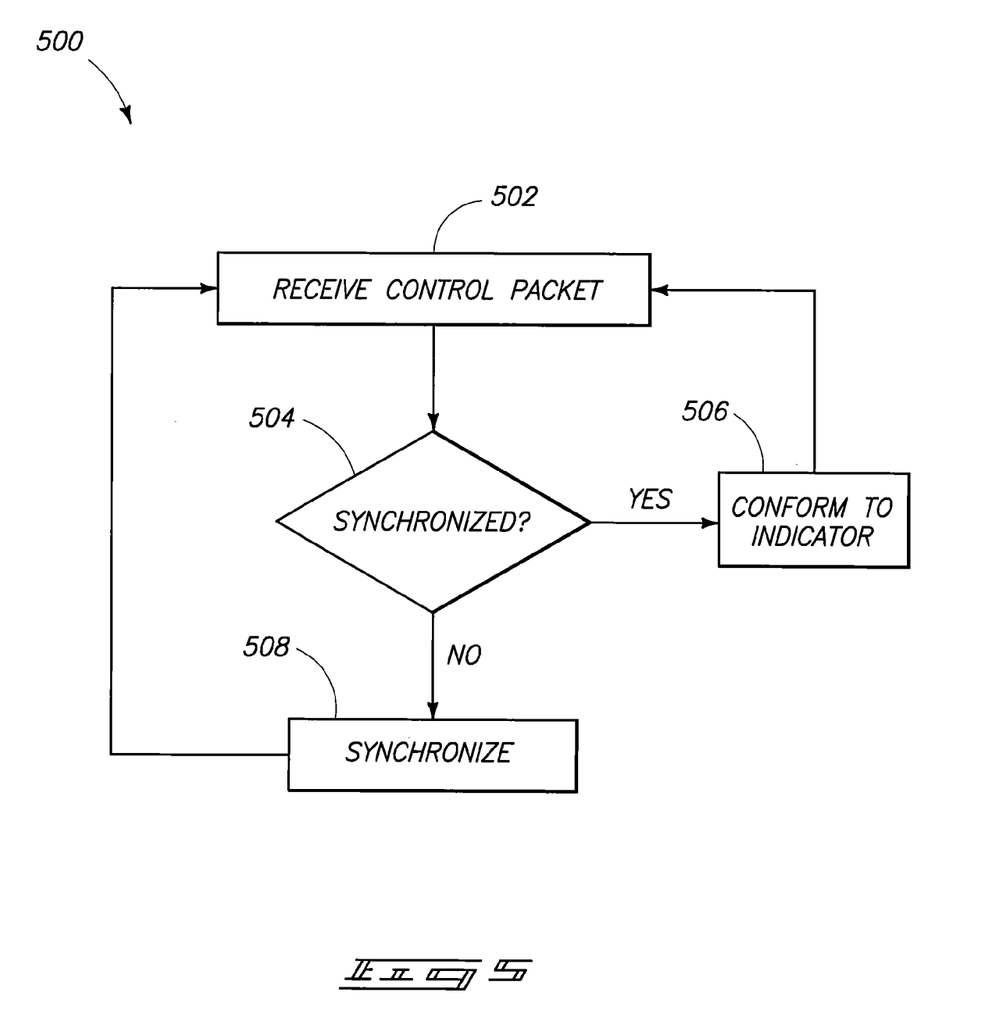
FIG. 5 illustrates a flow chart diagram of a method in accordance with an aspect of the invention.

FIG. 5 illustrates a method 500 that may be used by packet switches 102 and 104 in response to receiving a control packet containing a tunnel configuration. Although method 500 is described below in relation to packet switch 102, packet switch 104 may also follow method 500. At 502, packet switch 102 may receive a control packet from packet switch 104. The control packet may be received via tunnel 136. Additionally, a duplicate of the control packet may also be received via tunnel 144 if packet switch 104 is configured to send control packets containing tunnel configuration information on all associated tunnels, not just on active tunnels.

After receiving the control packet, packet switch 102 determines at 504 whether packet switch 102 is synchronized with the packet switch 104. Packet switch 102 and packet switch 104 may consider themselves synchronized if they were in agreement as to the configuration of tunnels 136, 138, 144, and 146 prior to the control packet being received.

In some configurations, packet switches 102 and 104 may be configured to consider themselves not synchronized after powering up. For example, packet switch 102 may be unsynchronized from a point in time immediately after powering up until either packet switch 102 determines that it has a tunnel configuration for tunnels 136, 138, 144, and 146 that matches packet switch 104 or until packet switch 102 executes method 600 described below.

If packet switches 102 and 104 are not synchronized, for example due to one of the scenarios described above, at 508 packet switch 102 synchronizes itself with packet switch 104 using, for example, method 600 described below.

If the control packet contains configuration information that is identical to the existing tunnel configuration of packet switch 102, packet switch 102 and packet switch 104 are synchronized and no configuration changes are made in response to receiving the control packet.

If packet switches 102 and 104 are synchronized, at 506 packet switch 102 modifies its tunnel configuration to comply with the tunnel configuration of packet switch 104 as communicated by the control packet.

Figure 6:
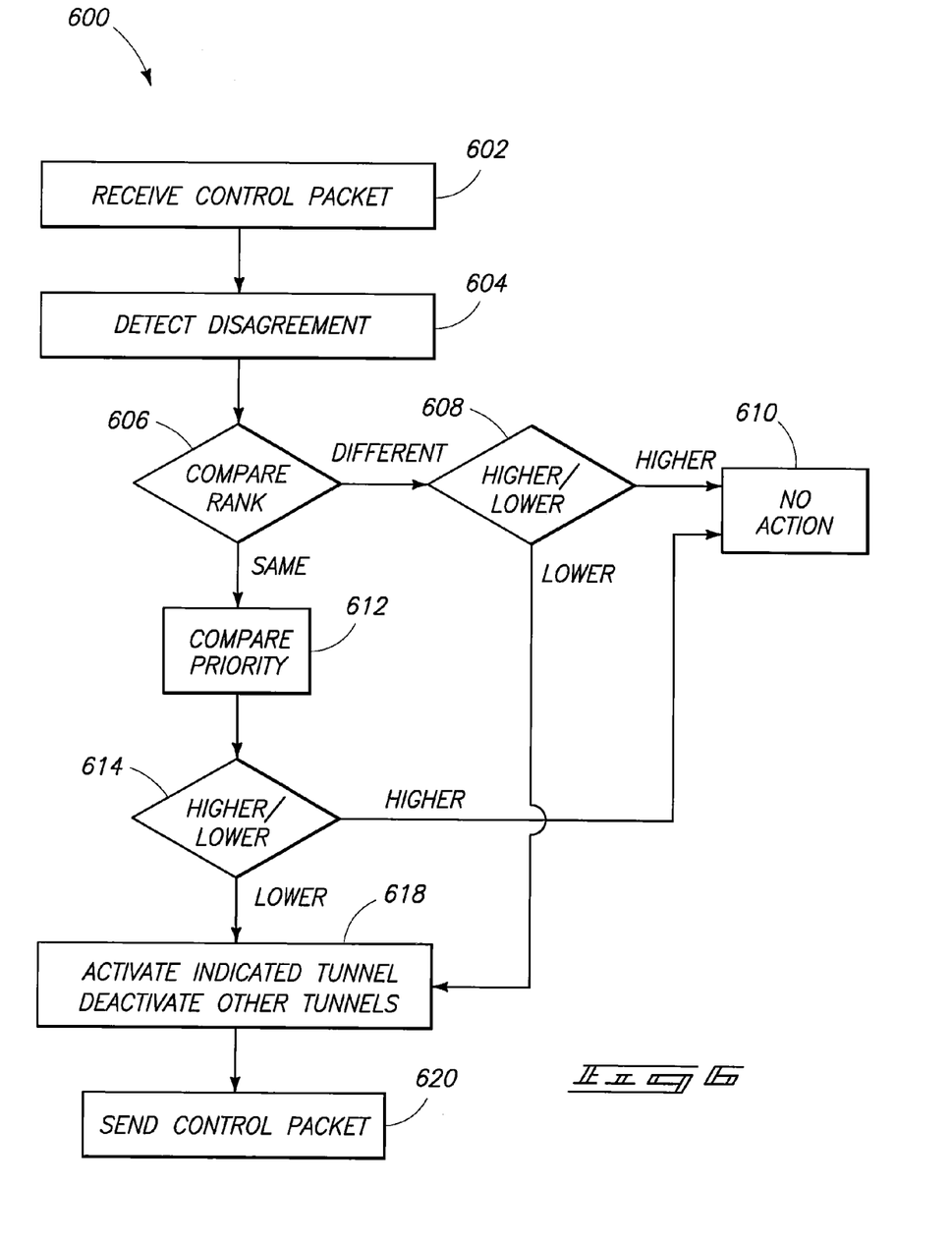
FIG. 6 illustrates a flow chart diagram of another method in accordance with an aspect of the invention.

FIG. 6 illustrates a flow chart describing a method 600 for synchronization. Although method 600 is described below in relation to packet switch 102, packet switch 104 may also follow method 600. At 602, packet switch 102 receives a control packet from packet switch 104 via tunnel 144 or tunnel 136. At 604, packet switch 104 detects that there is disagreement between packet switch 102 and packet switch 104 by comparing the state of the tunnels according to packet switch 104, as indicated in the control packet, with the configuration of the tunnels according to packet switch 102.

For example, upon receiving a control packet having contents illustrated by chart 404, packet switch 102 may compare chart 400 with chart 404, and determine that packet switch 102 has configured tunnels 136 and 138 to be active, but packet switch 104 has configured tunnels 144 and 146 to be active.

Next, at 606, packet switch 102 compares rank 306, as contained in the control packet sent by packet switch 104, with rank 301 (the rank of packet switch 102). If rank 301 is different from rank 306, at 608, packet switch 102 may determine whether rank 301 is higher than rank 306. If rank 301 is higher than rank 306, packet switch 102 might, at 610, take no action.

In other words, packet switch 102 might not change the configuration of the tunnels even though the control packet indicates that packet switch 104 is in disagreement with respect to the configuration of the tunnels. Instead, packet switch 102 may send a control packet to packet switch 104 containing the configuration of the tunnels according to packet switch 102. Upon receiving the control packet from packet switch 102, packet switch 104 may follow method 600 and accordingly may change its configuration to match that of packet switch 102 since packet switch 102 has a higher rank than packet switch 104. Consequently, packet switch 102 and packet switch 104 will be synchronized.

At 608 if rank 301 is lower than 306, then packet switch 102 may change its tunnel configuration to match the tunnel configuration of packet switch 104 by deactivating tunnels 136 and 138 and activating tunnels 144 and 146. At 606 if rank 301 is the same as rank 306, which is possible since the ranks are typically user-configured values not unique per packet switch, packet switch 102 compares, at 612, priority 302 with priority 308. Typically, priority 302 and priority 308 are unique numbers.

At 614, packet switch 102 determines whether priority 302 is higher than priority 308. If priority 302 is higher than priority 308, packet switch 102, at 610, takes no action. As was discussed above, packet switch 102 may send a control packet containing its tunnel configuration to packet switch 104, which may subsequently adapt its tunnel configuration to match that of packet switch 102 so that packet switch 102 and packet switch 104 are synchronized.

At 614, if priority 302 is lower than priority 308, packet switch 102, at 618, may activate the tunnels indicated as active in the control packet, and inactivate tunnels indicated as inactive in the control packet so that packet switch 102 has a tunnel configuration which is the same as packet switch 104. Consequently, packet switch 102 and packet switch 104 will be synchronized.

At 620, packet switch 102 may send a control packet to packet switch 104 containing the new tunnel configuration for packet switch 102.

Much of the discussion above has been directed to methods packet switches may perform in response to receiving a control packet containing tunnel configuration information. The following discussion is directed to methods packet switches may use to send control packets containing tunnel configuration information.

According to another aspect of the invention, a packet switch operating method includes detecting, at the packet switch, a change in a first tunnel's ability to relay packets between the packet switch and another packet switch. The packet switch and the other packet switch are coupled together by the first tunnel and a second tunnel. In response to the detecting, a control packet is sent to the other packet switch. The control packet indicates a particular one of the tunnels is active on the packet switch. The particular tunnel may be active on the packet switch and the other tunnel may be inactive on the packet switch. The first tunnel or the second tunnel may be the particular tunnel. A second control packet may be received from the other packet switch indicating that the particular tunnel is active on the other packet switch.

The packet switch may be configured to forward only control packets to the inactive other tunnel and may be configured to forward control packets and non-control packets to the active particular tunnel.

The control packet may be sent to the other packet switch via the particular tunnel. An additional control packet may be sent to the other packet switch via the tunnel that is not the particular tunnel. The additional control packet may indicate the particular tunnel is active on the packet switch.

The control packet may be an Ethernet CFMPDU compliant with the IEEE 802.1ag standard and one or more TLV fields of the control packet may provide the indication that the particular one of the tunnels is active on the packet switch. Furthermore, the control packet may be a CCM.

In some configurations, the packet switch may be configured to forward only control packets and packets conforming to the IEEE 802.1ah standard to the first tunnel.

Detecting the change in the first tunnel's ability to relay packets may be performed in a number of different ways. For example, detecting the change may include detecting that the first tunnel, which was previously unable to relay any packets, is now able to relay packets or detecting that the first tunnel, which was previously able to relay packets, is now unable to relay any packets. Alternatively, detecting the change may include detecting that both of the tunnels, which were both previously unable to relay any packets, are now both able to relay packets.

Detecting the change may alternatively include determining that the first tunnel, which was previously unable to relay packets because the packet switch was powered off, is now able to relay packets because the packet switch has been powered on.

Furthermore, detecting the change may include determining that a CCM has not been received from the first tunnel for at least a CCM loss interval associated with the first tunnel or determining that the first tunnel, which was previously able to relay packets, is now unable to relay packets due to planned maintenance.

The method may further include receiving a CCM that includes an RDI from the other packet switch prior to the detecting and in response to the detecting activating the particular tunnel on the packet switch and deactivating the first tunnel. In this case, the particular tunnel may be the second tunnel.

The tunnels may include a first set of tunnels and the packet switch and the other packet switch may be further coupled together by a second set of two or more tunnels. In this configuration, the first set of tunnels may relay packets only from the other packet switch to the packet switch and the second set of tunnels may relay packets only from the packet switch to the other packet switch. In this configuration, sending the control packet may include sending the control packet to the other packet switch via one of the tunnels of the second set of tunnels.

Figure 7:
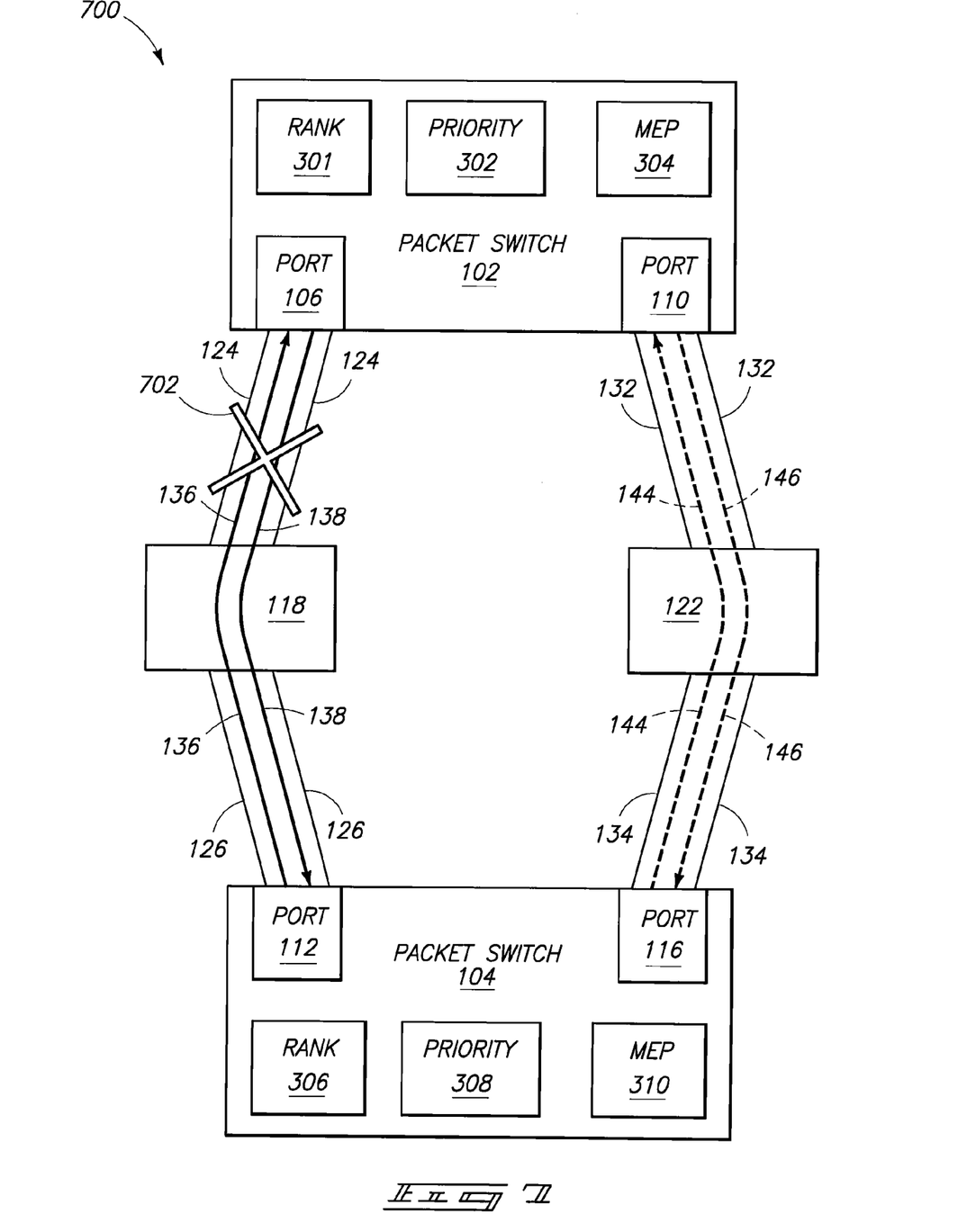
FIG. 7 illustrates the system of FIG. 3 having one physical link disabled.

FIG. 7 illustrates one scenario in which packet switch 102 may send a control packet containing tunnel configuration information. FIG. 7 illustrates a packet switch network 700 similar to packet switch network 300. However as indicated by symbol 702, physical link 124 has become non-operational. Packet switch 102 may detect that physical link 124 is no longer operational by detecting a lack of connectivity with intermediate packet switch 118 or a loss of link at port 106. Packet switch 102 may detect the loss of link immediately after physical link 124 becomes non-operational. In fact, packet switch 102 may detect the loss of link prior to the expiration of a CCM loss interval.

For example, packet switch 102 may detect that physical link 124 is down and may therefore immediately conclude that tunnels 136 and 138, which are facilitated by physical link 124, are non-operational. In response, packet switch 102 may inactivate tunnels 136 and 138 and activate tunnels 144 and 146. Packet switch 102 may then send a control packet to packet switch 104 via tunnel 146 indicating that tunnels 144 and 146 are active. The control packet may additionally indicate that tunnels 136 and 138 are inactive. In response to receiving the control packet, packet switch 104 may process the control packet according to method 400 thereby activating tunnels 144 and 146 and deactivating tunnels 136 and 138.

Sending a control packet in response to detecting that physical link 124 is down may enable packet switch 104 to transition from tunnels 136 and 138 to tunnels 144 and 146 more quickly than if packet switch 102 waits for a CCM loss interval associated with tunnel 136 or tunnel 138 to expire prior to sending a control packet to packet switch 104.

Furthermore, sending a control packet in response to detecting that physical link 124 is down may enable MEPs 304 and 310 to send CCM messages at a lower rate since packet switches 102 and 104 are no longer relying solely on CCM messages to determine the operational status of the tunnels. Reducing the rate at which CCM messages are sent may advantageously reduce the processing load of packet switches 102 and 104 and may reduce the amount of bandwidth consumed by CCM messages.

Figure 8:
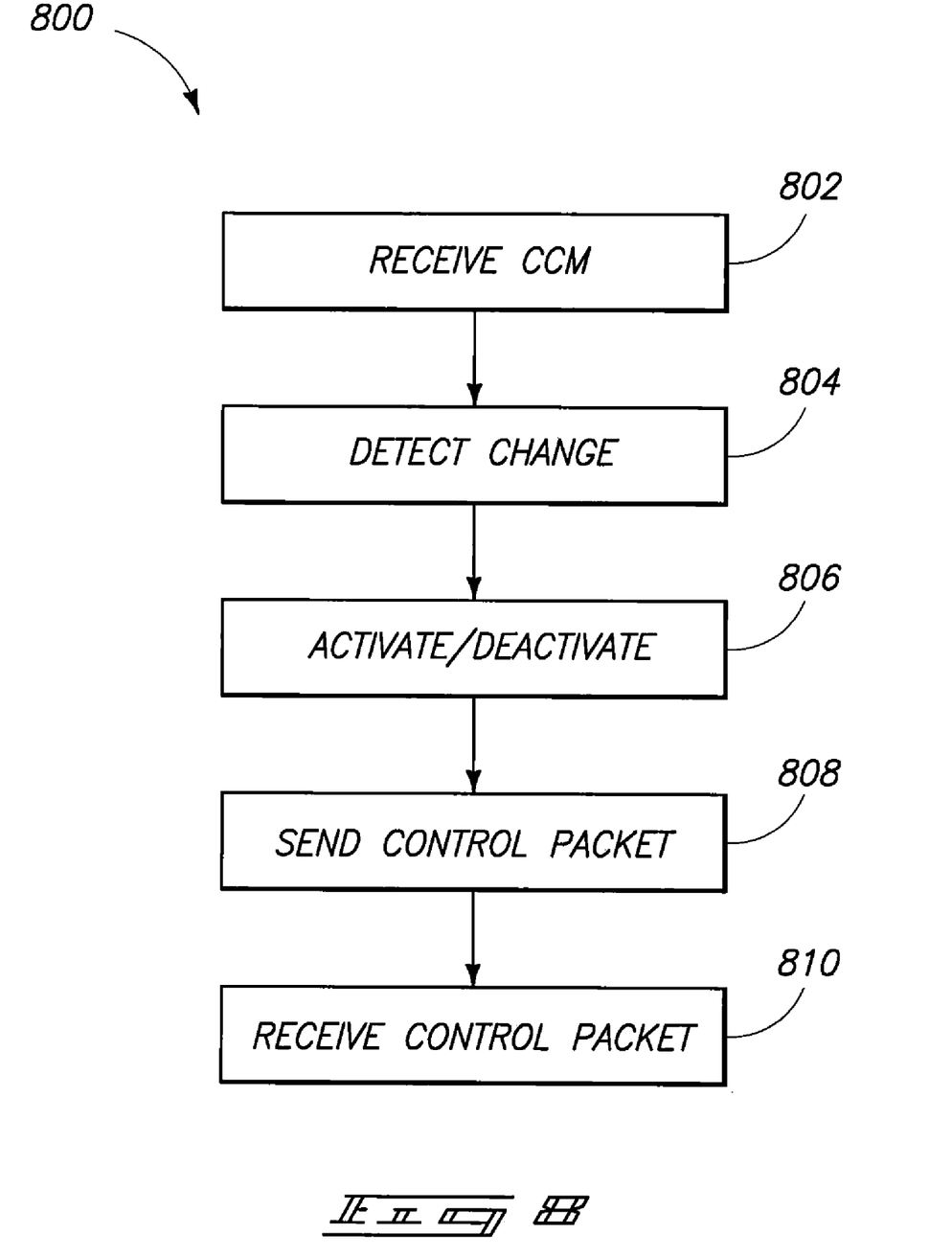
FIG. 8 illustrates a flow chart diagram of yet another method in accordance with an aspect of the invention.

FIG. 8 illustrates a method 800 that may be used in sending CCM messages. At 802, packet switch 102 (or packet switch 104) receives a CCM message from packet switch 104. At 804, packet switch 102 detects a change in the operational status of a tunnel. For example if the CCM is received on tunnel 136 and contains an RDI, packet switch 102 may determine that tunnel 138 is no longer operational, and thus tunnel 138 has had a change in operational status.

Other methods of detecting a change are also possible. For example, packet switch 102 may receive a CCM message on tunnel 136 and may then detect a change in the status of tunnel 136 by detecting that no CCM messages have been received from tunnel 136 for at least a CCM loss interval. Thus, tunnel 136 is no longer operational and has had a change in status.

In another situation, tunnel 144 and tunnel 146 may be active, and tunnel 136 and tunnel 138 may be inactive. Subsequently, packet switch 102 may receive a CCM message on tunnel 136 indicating that tunnel 136 is now operational, although still inactive. Consequently, packet switch 102 may determine that tunnel 136 has had a change in status.

At 806, packet switch 102 may activate or deactivate a tunnel. For example, if packet switch 102 determines that tunnel 136 is no longer operational, packet switch 102 may inactivate tunnel 136 and activate tunnel 144. At 808, packet switch 102 may send a control packet to packet switch 104 indicating the status of the tunnels on packet switch 102. Upon receiving the control packet, packet switch 104 may utilize method 400 or 600.

At 810, packet switch 102 may subsequently receive a control packet from packet switch 104 indicating the status of the tunnels on packet switch 104.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method for activating a layer two Ethernet tunnel upon receipt of an Ethernet control packet, comprising:
  receiving, at a packet switch, an Ethernet control packet from another packet switch, the packet switch and the other packet switch being coupled together by two or more tunnels comprising Ethernet tunnels defined by one or more Ethernet identifiers, the Ethernet control packet indicating that a particular one of the tunnels is active on the other packet switch and indicating that all of the tunnels other than the particular tunnel are inactive on the other packet switch and the Ethernet control packet being an Ethernet connectivity fault management protocol data unit (CFMPDU) having one or more type length value (TLV) fields providing the indication that the particular one of the tunnels is active on the other packet switch;
  prior to expiration of a continuity check message (CCM) loss interval and in response to receiving the Ethernet control packet, activating on the packet switch the particular tunnel as defined by the one or more Ethernet identifiers indicated by the received control packet, wherein the receiving and activating are performed with and based on Ethernet packets comprising the Ethernet control packet;
  in response to receiving the Ethernet control packet, deactivating one of the tunnels that was active when the Ethernet control packet was received by configuring the packet switch to forward only Ethernet control packets to the deactivated tunnel; and
  wherein the tunnels comprise a first set of tunnels and a second set of different tunnels, the first set of tunnels relaying packets only from the packet switch to the other packet switch and the second set of tunnels relaying packets only from the other packet switch to the packet switch, wherein only one tunnel of the first set is active at a time, the other tunnels of the first set being inactive and only one tunnel of the second set is activate at a time, the other tunnels of the second set being inactive and wherein the receiving the Ethernet control packet comprises receiving the Ethernet control packet from one of the tunnels of the second set of tunnels.

2. The method of claim 1 wherein the Ethernet control packet is configured convey information related to two or more attributes associated with each of the two or more tunnels.

3. The method of claim 1 wherein the two or more tunnels each comprise an Ethernet packet tunnel configured to relay Provider Backbone Bridging (PBB) packets or Provider Backbone Transport (PBT) packets.

4. The method of claim 1 wherein the deactivating comprises configuring the packet switch to discard non-control packets received from the deactivated tunnel.

5. The method of claim 1 further comprising:
  after receiving the Ethernet control packet, determining that the particular tunnel is inactive in the packet switch; and
  determining the other packet switch has a higher rank than the packet switch with respect to the tunnels based on a rank field of the received Ethernet control packet and a rank of the packet switch.

6. The method of claim 5 wherein the rank field and the rank of the packet switch both comprise at least one item selected from among a user-configurable value, a medium access control (MAC) address, and a serial number.

7. The method of claim 1 further comprising:
  after receiving the Ethernet control packet, determining the particular tunnel is inactive in the packet switch;
  determining the other packet switch has a same rank as the packet switch with respect to the tunnels based on a rank field of the received Ethernet control packet and a rank of the packet switch; and
  determining that the other packet switch has a higher priority than the packet switch with respect to the tunnels based on a priority field of the received Ethernet control packet and a priority of the packet switch.

8. The method of claim 7 wherein the priority field and the priority of the packet switch both comprise at least one item selected from among a user-configurable value, a MAC address, and a serial number.

9. The method of claim 1 wherein the Ethernet control packet further indicates that all of the tunnels other than the particular tunnel are inactive on the other packet switch.

10. The method of claim 1 wherein the activating comprises configuring the packet switch to forward Ethernet control packets and non-control packets to the other packet switch via the particular tunnel.

11. The method of claim 1 wherein the activating comprises configuring the packet switch to accept Ethernet control packets and non-control packets received from the other packet switch via the particular tunnel.

12. The method of claim 1 wherein one or more type length value (TLV) fields of the Ethernet control packet provide the indication that the particular one of the tunnels is active on the other packet switch.

13. The method of claim 12 wherein the activating comprises activating the particular tunnel prior to the expiration of a continuity check message (CCM) loss interval.

14. A packet switch configured to implement the method of claim 1.

15. A packet switch operating method for activating a layer two Ethernet tunnel upon receipt of an Ethernet control packet, comprising:
receiving, at a packet switch, an Ethernet control packet from another packet switch, the packet switch and the other packet switch being coupled together by two or more tunnels comprising Ethernet tunnels defined by one or more Ethernet identifiers, the Ethernet control packet indicating that a particular one of the tunnels is active on the other packet switch and the Ethernet control packet being an Ethernet connectivity fault management protocol data unit (CFMPDU) having one or more type length value (TLV) fields providing the indication that the particular one of the tunnels is active on the other packet switch;
after receiving the Ethernet control packet, determining that the particular tunnel is inactive in the packet switch;
determining the other packet switch has a higher rank than the packet switch with respect to the tunnels based on a rank field of the received Ethernet control packet and a rank of the packet switch, the rank field and the rank of the packet switch both comprising at least one item selected from among a user-configurable value, a medium access control (MAC) address, and a serial number;
in response to receiving the Ethernet control packet, activating on the packet switch the particular tunnel as defined by the one or more Ethernet identifiers indicated by the received Ethernet control packet, wherein the receiving and activating are performed with and based on Ethernet packets comprising the Ethernet control packet;

in response to receiving the Ethernet control packet, deactivating one of the tunnels that was active when the Ethernet control packet was received by configuring the packet switch to forward only Ethernet control packets to the deactivated tunnel; and
wherein the tunnels comprise a first set of tunnels and a second set of different tunnels, the first set of tunnels relaying packets only from the packet switch to the other packet switch and the second set of tunnels relaying packets only from the other packet switch to the packet switch, wherein only one tunnel of the first set is active at a time, the other tunnels of the first set being inactive and only one tunnel of the second set is activate at a time, the other tunnels of the second set being inactive and wherein the receiving the Ethernet control packet comprises receiving the Ethernet control packet from one of the tunnels of the second set of tunnels.

16. The method of claim 15 wherein the Ethernet control packet is configured convey information related to two or more attributes associated with each of the two or more tunnels.

17. The method of claim 15 wherein the two or more tunnels each comprise an Ethernet packet tunnel configured to relay Provider Backbone Bridging (PBB) packets or Provider Backbone Transport (PBT) packets.

18. The method of claim 15 wherein the deactivating comprises configuring the packet switch to discard non-control packets received from the deactivated tunnel.

19. The method of claim 15 further comprising:
after receiving the Ethernet control packet, determining that the particular tunnel is inactive in the packet switch; and
determining the other packet switch has a higher rank than the packet switch with respect to the tunnels based on a rank field of the received Ethernet control packet and a rank of the packet switch.

20. The method of claim 19 wherein the rank field and the rank of the packet switch both comprise at least one item selected from among a user-configurable value, a medium access control (MAC) address, and a serial number.

* * * * *